(12) United States Patent
Morimoto

(10) Patent No.: US 9,007,641 B2
(45) Date of Patent: Apr. 14, 2015

(54) INFORMATION PROCESSING APPARATUS, CONTROL METHOD, AND STORAGE MEDIUM

(71) Applicant: Canon Kabushiki Kaisha, Tokyo (JP)

(72) Inventor: Hiroaki Morimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/148,474

(22) Filed: Jan. 6, 2014

(65) Prior Publication Data

US 2014/0192376 A1    Jul. 10, 2014

(30) Foreign Application Priority Data

Jan. 8, 2013  (JP) .................................. 2013-001087

(51) Int. Cl.
*G06F 15/00* (2006.01)
*G06K 15/02* (2006.01)
*G06F 3/12* (2006.01)
*G06K 15/00* (2006.01)

(52) U.S. Cl.
CPC .......... *G06K 15/1809* (2013.01); *G06F 3/1259* (2013.01); *G06F 3/121* (2013.01); *G06F 3/1229* (2013.01); *G06F 3/1284* (2013.01); *G06K 15/1806* (2013.01); *G06K 15/402* (2013.01)

(58) Field of Classification Search
USPC ........................................................ 358/1.15
See application file for complete search history.

(56) References Cited

U.S. PATENT DOCUMENTS

2004/0036911 A1 *  2/2004  Saida ........................... 358/1.15

FOREIGN PATENT DOCUMENTS

JP          2000-259368 A      9/2000

* cited by examiner

*Primary Examiner* — Saeid Ebrahimi Dehkordy
(74) *Attorney, Agent, or Firm* — Canon USA, Inc., IP Division

(57) ABSTRACT

An information processing apparatus instructs a printing apparatus to stop print processing for a print command to be processed by the printing apparatus via a universal serial bus, if status information indicating a status of the printing apparatus indicates that the printing apparatus is in a state where the print processing cannot be continued, wherein the print command is generated by a printer driver configured not to include a language monitor.

19 Claims, 11 Drawing Sheets

FIG.5

IDENTIFICATION INFORMATION: 12345678-ABCD-1234-EFGH-123456789012

INFORMATION PROCESSING APPARATUS, CONTROL METHOD, AND STORAGE MEDIUM

BACKGROUND OF THE INVENTION

1. Field of the Invention

The present invention relates to an information processing apparatus that provides a function of canceling a print job.

2. Description of the Related Art

A general printing system includes a printing apparatus that can perform recording on a paper medium, a control apparatus that controls the printing apparatus and generates print job data, and a communication interface that connects both the printing apparatus and the control apparatus. In the control apparatus, an operating system (hereinafter also referred to as an OS) is operating, and various types of software such as an application and a printer driver are operable on the OS. When a document generated by the application is printed, each of the application, the printer driver, and the OS performs required processing in a specified procedure to generate a print command, and the generated print command is sent to the printing apparatus so that the printing apparatus starts print processing on a paper medium. A conventional printer driver includes a user interface module for managing an input from a user or an application, a command generation module (hereinafter also referred to as a command generation filter) for generating a print command, and a communication control module (hereinafter also referred to as a language monitor) for controlling communication processing between a control apparatus and a printing apparatus as main elements. The printer driver including a group of these modules is referred to as a Version 3 driver (hereinafter also referred to as a V3 driver). The language monitor receives a print command generated by the command generation filter via an OS and sends the received print command to the printing apparatus to transfer a print job to the printing apparatus. Further, when the language monitor receives a request to cancel a print job from the user or the application, the language monitor performs processing for canceling the print job. At this time, if the printing apparatus is performing print processing for the print job to be canceled, the language monitor needs to instruct the OS to send a print cancel command to the printing apparatus, and cause the printing apparatus to stop the print processing for the print job. As another method, if the language monitor receives a request to cancel a print job while performing processing for sending a print command, the language monitor detects information about a break in the sent command and determines whether the print command has been completely sent to the printing apparatus according to the detected information. There is known a method for stopping printing in which, if the language monitor determines that the printing has not successfully been completed, the language monitor generates optimum complementary data and performs control to send the complementary data to a printer subsequent to the sent data (see Japanese Patent Application Laid-Open No. 2000-259368).

On the other hand, in Windows (registered trademark) 8 and Windows (registered trademark) RT, which have been introduced by Microsoft Corporation in recent years, a printer driver configuration different from the above-mentioned configuration has been used. A module group constituting a new printer driver does not include a language monitor. A usable communication port is limited to a universal serial bus (hereinafter also referred to as USB) port and a web service on device (hereinafter also referred to as WSD) port. The printer driver having such a configuration is referred to as a Version4 driver (hereinafter also referred to as a V4 driver). In the V4 driver, a spooler provides processing for sending a print command generated by a command generation filter to a printing apparatus. When a request to cancel a print job is issued from a user or an application, the spooler performs processing for canceling the print job.

However, if the printing apparatus and the control apparatus are connected to each other via a USB (trademark) and if an error that causes the printing apparatus to be unable to continue the print processing has occurred therein, even when a request to cancel a print job in which the error has occurred is issued, the spooler may not instruct the OS to send a print cancel command to the printing apparatus. Generally, when the spooler receives a request to cancel a print job, the spooler instructs the OS to send a print cancel command after executing EndDocPort( ) of a USB port monitor as processing for canceling the print job. However, if an error that causes the printing apparatus to be unable to continue the print processing has occurred therein, the USB port monitor cannot complete the processing in EndDocPort( ) and the spooler cannot issue a request to the OS to send a print cancel command subsequently to the processing. This causes a problem that even if the user or the application desires to stop printing for the print job in which the error has occurred, the error in the printing apparatus cannot be released, and the printing apparatus does not shift to an initial state or start the subsequent print job.

Instead of the spooler, the command generation filter serving as a constituent element of the V4 driver can also receive a request to cancel a print job from the user or the application, and instruct the OS to send a print cancel command to the printing apparatus. However, in the V4 driver, the spooler controls processing for sending print data to the printing apparatus, and the command generation filter cannot be involved in sending the generated print data. Thus, the command generation filter cannot determine which print job has been processed in the printing apparatus. Generally, the print cancel command is not to be issued to the printing apparatus if the printing apparatus does not process the print job to be canceled. More specifically, this restriction indicates that the command generation filter cannot appropriately determine whether to instruct the OS to send a print cancel command.

SUMMARY OF THE INVENTION

The present invention is directed to a method in which a command generation filter or a spooler appropriately determines a status of a printing apparatus even if a printer driver does not include a language monitor as a constituent element, so that an appropriate print job cancel function can be implemented.

According to an aspect of the present invention, an information processing apparatus includes an acquisition unit configured to acquire status information indicating a status of a printing apparatus, and an instruction unit configured to instruct the printing apparatus to stop print processing for a print command to be processed by the printing apparatus via a universal serial bus, if the status information acquired by the acquisition unit indicates that the printing apparatus is in a state where the print processing cannot be continued, wherein the print command is generated by a printer driver configured not to include a language monitor.

Further features of the present invention will become apparent from the following description of exemplary embodiments with reference to the attached drawings.

BRIEF DESCRIPTION OF THE DRAWINGS

FIG. 5 illustrates an example of identification information to be added to print data.

DESCRIPTION OF THE EMBODIMENTS

Various exemplary embodiments, features, and aspects of the invention will be described in detail below with reference to the drawings.

Figure 1:
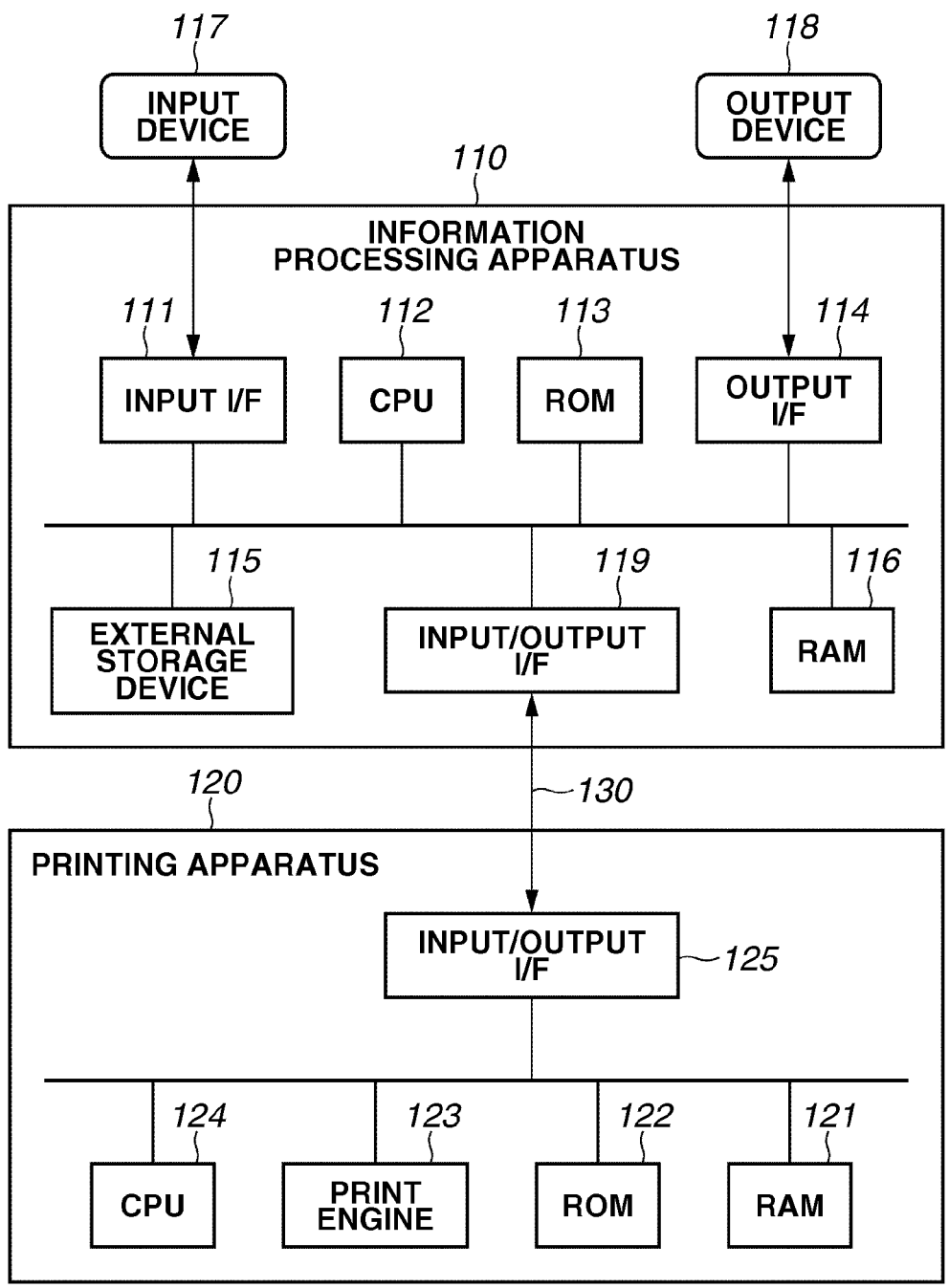
FIG. 1 is a block diagram illustrating a printing system including a printing apparatus and an information processing apparatus.

A first exemplary embodiment of the present invention will be described below. FIG. 1 is an example of a block diagram illustrating the entire configuration of a printing system including an information processing apparatus 110 and a printing apparatus 120 connected to the information processing apparatus 110. The information processing apparatus 110 includes an input interface (I/F) 111, a central processing unit (CPU) 112, a read-only memory (ROM) 113, an output I/F 114, an external storage device 115, a random access memory (RAM) 116, an input device 117, an output device 118, and an input/output I/F 119. The ROM 113 stores an initialization program, and the external storage device 115 stores an OS, a printer driver, and various other data. The RAM 116 is used as a work memory for various programs stored in the external storage device 115. The input device 117 is used for data input and operation instruction and is connected to the input I/F 111. The output device 118 is used for data display and status notification and is connected to the output I/F 114.

The printing apparatus 120 includes a RAM 121, a ROM 122, a print engine 123, a CPU 124, and an input/output I/F 125. The information processing apparatus 110 and the printing apparatus 120 are connected to each other via a USB (trademark) cable 130 serving as a connection unit capable of bidirectional communication. The RAM 121 is used as a work memory of the CPU 124, and is also used as a buffer for temporarily storing received data. The ROM 122 stores a control command. The print engine 123 performs printing based on data stored in the RAM 121. The CPU 124 controls the printing apparatus 120 according to the control command stored in the ROM 122. While sharing of the processing between the information processing apparatus 110 and the printing apparatus 120 is illustrated above in the present exemplary embodiment, how the processing is shared is not dependent on this.

Figure 2:
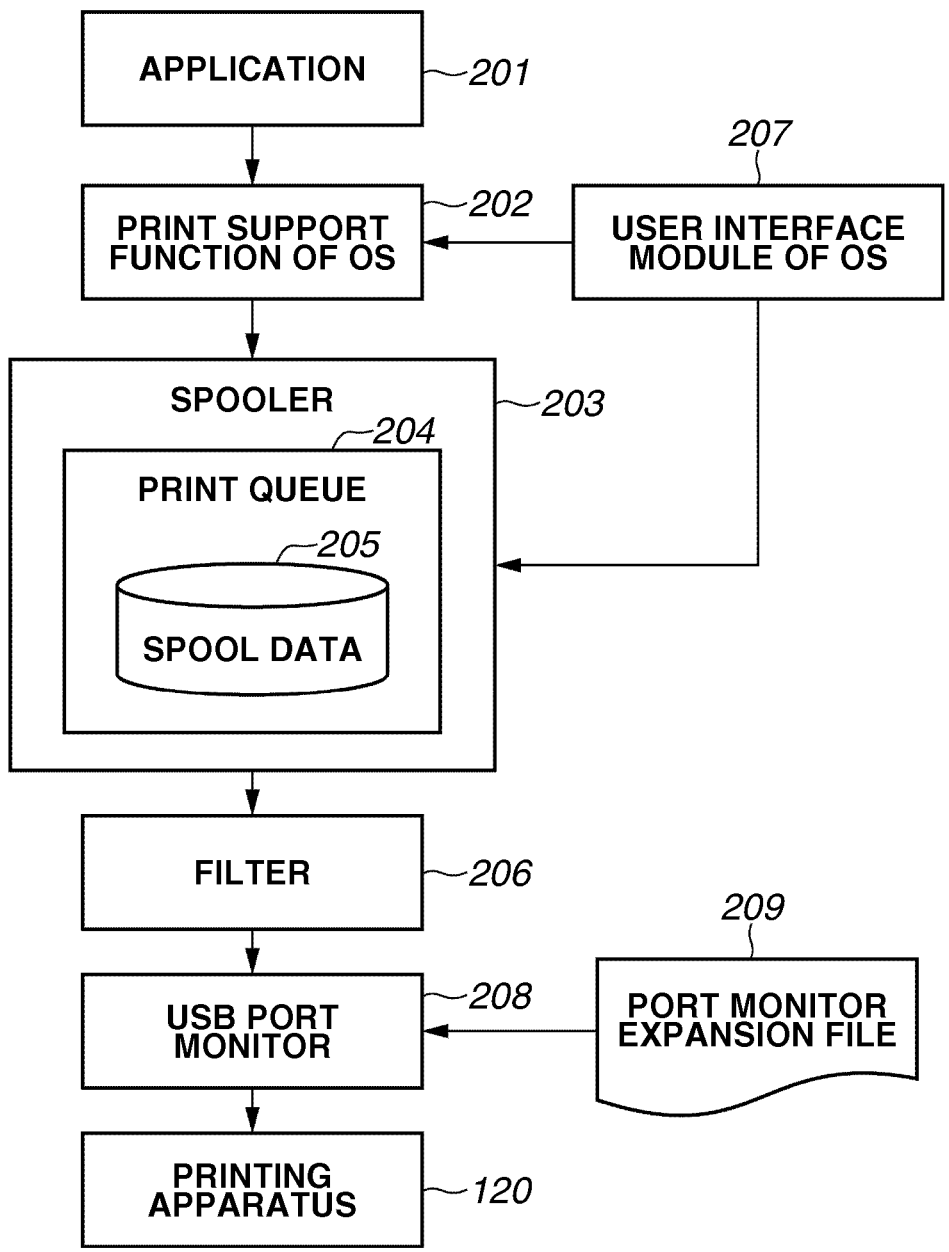
FIG. 2 is a conceptual diagram illustrating a configuration of a V4 printer driver.
Figure 3:
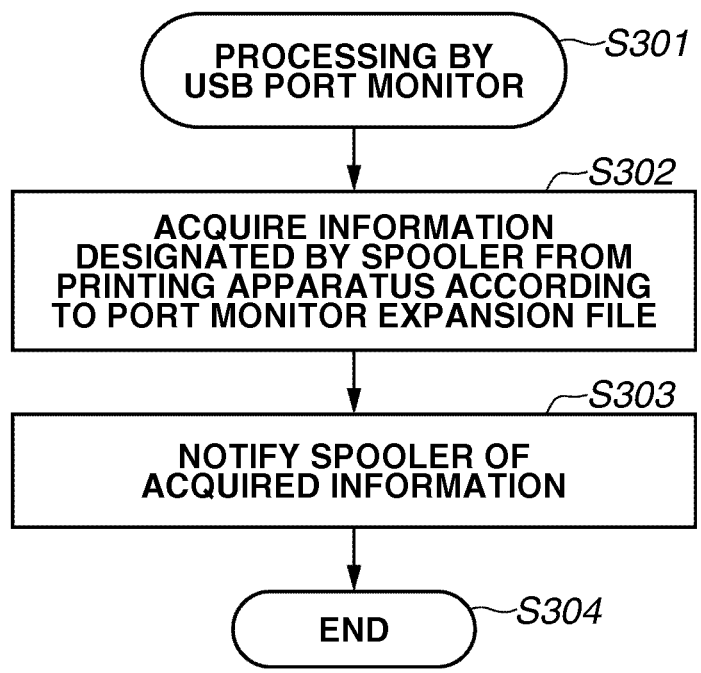
FIG. 3 is a flowchart illustrating processing by a USB port monitor.

FIG. 2 is an example of a block diagram conceptually illustrating a configuration of a V4 printer driver, which the present exemplary embodiment is premised on. Print data generated by an application 201 is temporarily stored in a print queue 204 in a spooler 203 as spool data 205 via a print support function 202 of an operating system (OS) operating on the information processing apparatus 110. The stored spool data 205 is sent to the printing apparatus 120 and printed after being converted into a print command, which is interpretable by the printing apparatus 120, by a command generation filter 206. When issuing a print instruction, the application 201 adds print setting information, which has been returned from a user interface module 207 of the OS, to the print data via the print support function 202 of the OS. The print setting information is information set prior to a print start instruction from the application 201. The command generation filter 206 subjects the input print data to processing such as processing, conversion, non-conversion, and generation, to output data that is interpretable by the printing apparatus 120. Processing for inputting the print data to the command generation filter 206 and predetermined processing for the print data are controlled using a command generation filter control function (not illustrated) of the OS. The command generation filter 206 subjects the received print data to conversion to generate a print command, which is interpretable by the printing apparatus 120, according to the print setting information added to the received print data. Then, the command generation filter 206 sequentially outputs the generated print command to the RAM 116 and the external storage device 115 in the information processing apparatus 110. The print command, which has been output to the RAM 116 and the external storage device 115 by the command generation filter 206, is sequentially read out by the spooler 203, and is sent to the printing apparatus 120 via a USB port monitor 208. The USB port monitor 208 can acquire arbitrary information from the printing apparatus 120 by operating according to a description of a port monitor expansion file 209 in response to an instruction from the spooler 203. FIG. 3 illustrates a flow of processing by the USB port monitor 208 for acquiring information from the printing apparatus 120. In step S301, the USB port monitor 208 starts the processing in response to an instruction from the spooler 203. In step S302, the USB port monitor 208 then operates according to the port monitor expansion file 209 to acquire information designated by the spooler 203 from the printing apparatus 120. In step S303, the USB port monitor 208 then notifies the spooler 203 of the acquired information. In step S304, the processing is ended. The USB port monitor 208 notifies the spooler 203 of the information acquired from the printing apparatus 120 so that the command generation filter 206 can acquire the information, which has been acquired from the printing apparatus 120 by the USB port monitor 208, via the spooler 203.

Figure 4:
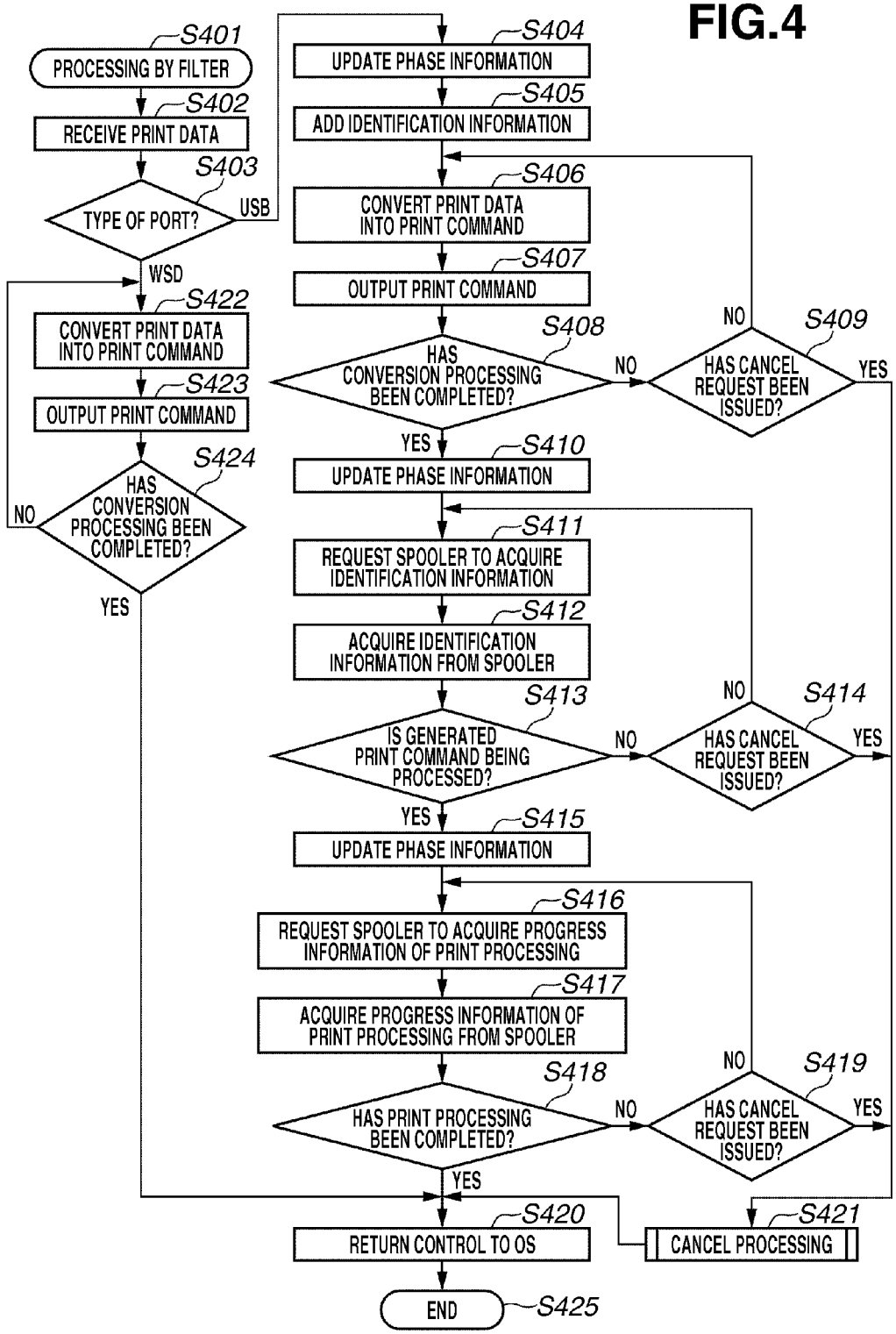
FIG. 4 is a flowchart illustrating processing by a command generation filter according to a first exemplary embodiment of the present invention.
Figure 6:
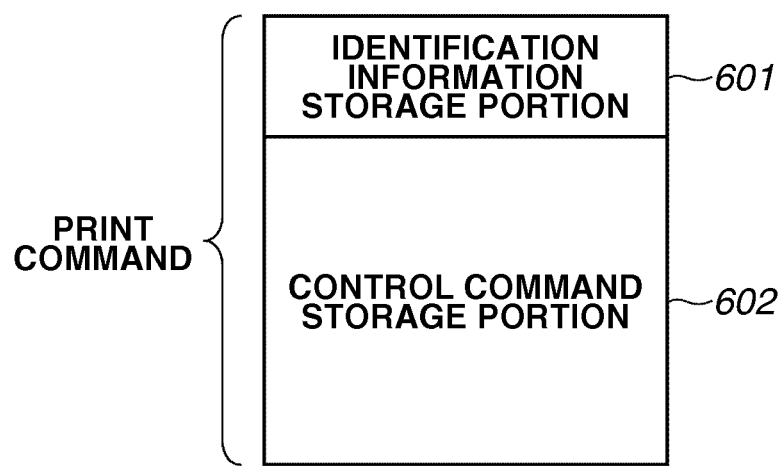
FIG. 6 is a schematic view illustrating an entire image of a print command to be generated by a command generation filter.

FIG. 4 illustrates a flow of processing by the command generation filter 206 according to the first exemplary embodiment. In step S401, the command generation filter 206 is first started using the command generation filter control function of the OS, to start processing. In step S402, the command generation filter 206 then receives print data generated by the application 201 from the command generation filter control function of the OS. In step S403, the command generation filter 206 then determines the type of communication port used between the information processing apparatus 110 and the printing apparatus 120. If the information processing apparatus 110 and the printing apparatus 120 are connected to each other via a USB port in step S403, then in step S404, the command generation filter 206 records information indicating the start of processing for converting the received print data into a print command and outputting the print command as current processing phase information. In step S405, the command generation filter 206 then adds to the received print data identification information for uniquely identifying the print data. FIG. 5 illustrates an example of the identification information to be added to the print data. While the identification information illustrated in FIG. 5 is represented by numerical characters, hyphens, and alphabetic characters, a configuration of the identification information is not limited to this example. In step S406, the command generation filter 206 then subjects the received print data to conversion to generate a print command including identification information, which is interpretable by the printing apparatus 120, according to print setting information added to the print data. Here, prior to the print command generation processing, the command generation filter 206 may add page configuration processing for changing the order of pages of the print data or reconstructing a plurality of pages as one page according to the print setting information added to the received print data. FIG. 6 is a schematic view illustrating an entire image of a print command to be generated by the command generation filter 206. The print command to be generated by the command generation filter 206 includes an identification information storage portion 601 and a control command storage portion 602. The identification information storage portion 601 stores identification information for uniquely identifying print data, which is added in step 405. The control command storage portion 602 stores a command for controlling an operation of the printing apparatus 120, which is obtained when the command generation filter 206 subjects received print data to predetermined conversion. In step S407, the command generation filter 206 then temporarily outputs the print command including the identification information into a storage area (115 or 116) in the information processing apparatus 110. At this time, the spooler 203 sequentially sends the print command including the identification information, which has been output by the command generation filter 206, to the printing apparatus 120 if the printing apparatus 120 is ready to receive the print command. If the printing apparatus 120 is not ready to receive the print command, the spooler 203 puts the sending processing on hold until the printing apparatus 120 has become ready to receive the print command.

In step S408, the command generation filter 206 checks whether there exists any print data that has not yet been converted into a print command. If any unconverted print data exists (NO in step S408), the processing proceeds to step S409. In step S409, the command generation filter 206 checks whether a request has been issued for cancelling print processing on print data indicated by the print command generated by the command generation filter 206. When the OS has called ShutdownOperation( ) available as a public function that is callable from an external program, the command generation filter 206 determines that the cancel request has been issued. If the cancel request has been issued (YES in step S409), the processing proceeds to step S421. If the cancel request has not been issued (NO in step S409), the processing returns to step S406. In step S406, the command generation filter 206 continues processing for converting and outputting the print data that has not yet been subjected to conversion processing. The processing in step S421 will be described below with reference to FIG. 7.

If the command generation filter 206 detects that conversion of print data into a print command has been completed (YES in step S408), then in step S410, the command generation filter 206 changes the current processing phase information to information indicating that conversion processing into a print command has been completed. In step S411, the command generation filter 206 then requests the spooler 203 to acquire identification information added to a print command that is being processed in the printing apparatus 120. The spooler 203, which has received the request, instructs the USB port monitor 208 to acquire the identification information added to the print command that is being processed in the printing apparatus 120. The USB port monitor 208, which has received the instruction from the spooler 203, acquires the identification information and notifies the spooler 203 of the acquired identification information according to the procedure illustrated in FIG. 3. In step S412, the command generation filter 206 then acquires the identification information, which has been acquired by the USB port monitor 208, from the spooler 203. In step S413, the command generation filter 206 then determines based on the acquired identification information whether the print command generated by itself is being processed in the printing apparatus 120. If the generated print command is being processed (YES in step S413), the processing proceeds to step S415. Otherwise (NO in step S413), the processing proceeds to step S414. In step S414, the command generation filter 206 checks whether a request has been issued for cancelling print processing on print data indicated by the print command generated by the command generation filter 206. If the cancel request has been issued (YES in step S414), the processing proceeds to step S421. If the cancel request has not been issued (NO in step S414), the processing returns to step S411. If the generated print command is being processed (YES in step S413), then in step S415, the command generation filter 206 changes the current processing phase information to information indicating that print processing for the print command, which has been output by the command generation filter 206, is being performed in the printing apparatus 120. In step S416, the command generation filter 206 then requests the spooler 203 to acquire progress information of the print processing that is being performed in the printing apparatus 120. The spooler 203, which has received the request, instructs the USB port monitor 208 to acquire the progress information of the print processing that is being performed in the printing apparatus 120. The USB port monitor 208, which has received the instruction from the spooler 203, acquires the progress information and notifies the spooler 203 of the acquired progress information according to the procedure illustrated in FIG. 3. In step S417, the command generation filter 206 then acquires the progress information, which has been acquired by the USB port monitor 208, from the spooler 203. In step S418, the command generation filter 206 then determines based on the progress information acquired in step S417 whether the print processing in the printing apparatus 120 has been completed. Only if the print processing has been completed (YES in step S418), then in step S420, the command generation filter 206 returns control to the command generation filter control function of the OS. In step S425, the processing by the command generation filter 206 is ended. Generally, when the spooler 203 has completed the sending processing for a print command to be sent to the USB port monitor 208, the spooler 203 deletes the print job corresponding to the sent print command from the print queue 204. Because of this, even if print processing performed by the printing apparatus 120 for a print command received from the spooler 203 has not yet been completed, the print job corresponding to the print command may not exist in the print queue 204. In this case, since the print job does not exist in the print queue 204, the user or the application cannot issue a request to cancel the print job that is being processed. And, the spooler 203 cannot complete sending processing on a print command output by the command generation filter 206 until the command generation filter 206 returns control to the command generation filter control function of the OS. More specifically, the print job corresponding to the print command, which has been output by the command generation filter 206, can be stored in the print queue 204 until the print processing on the print command is completed by performing steps S416, S417, and S418.

Figure 7:
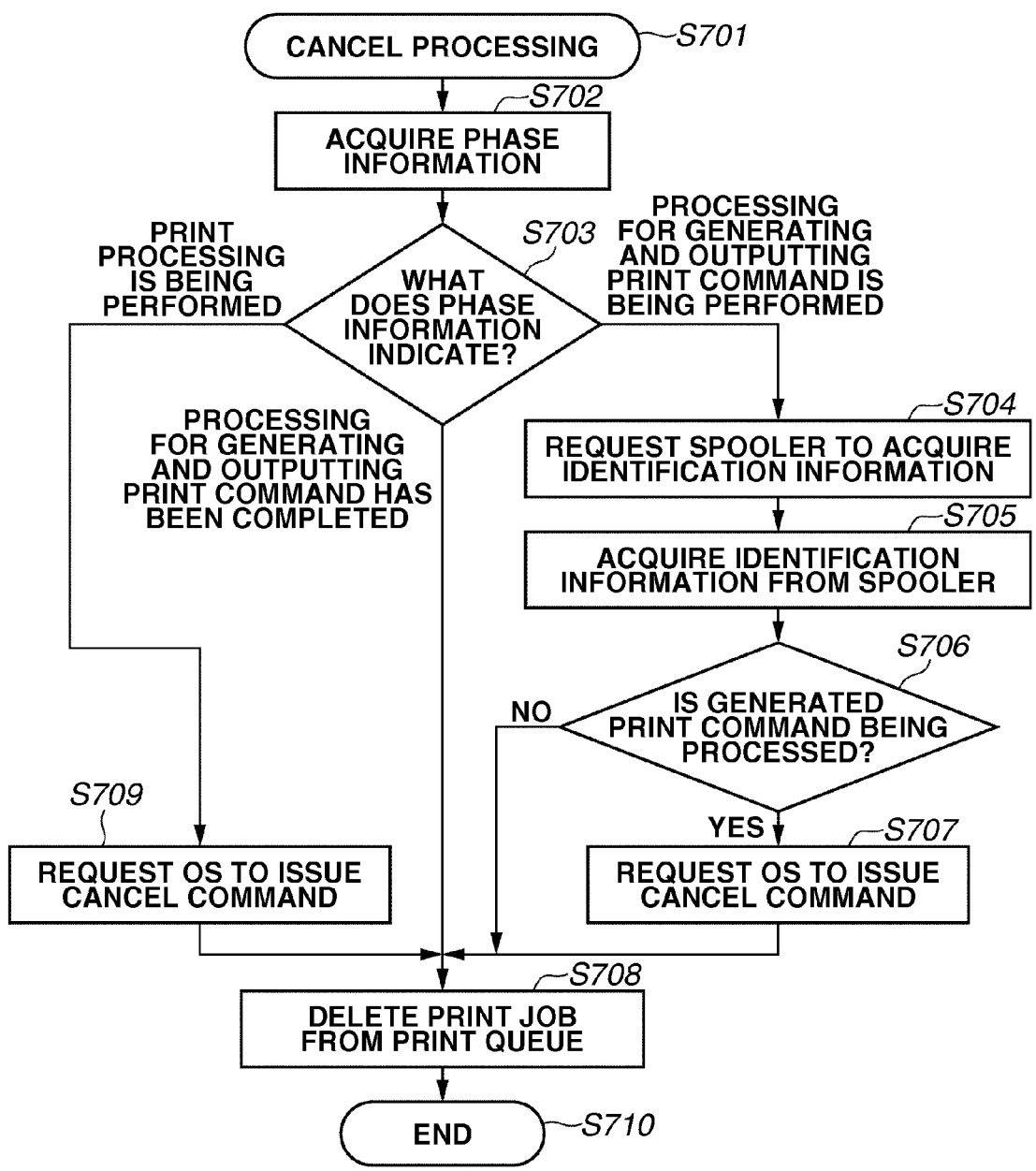
FIG. 7 is a sub-flowchart illustrating print job cancel processing by a command generation filter.

FIG. 7 illustrates a flow of cancel processing in step S421 by the command generation filter 206 illustrated in FIG. 4. If the cancel request has been issued (YES in steps S409, S414, and S419 in FIG. 4), then in step S701, the command generation filter 206 starts processing for canceling a print job. In step S702, the command generation filter 206 then acquires current processing phase information recorded in a predetermined area of the information processing apparatus 110. In step S703, the command generation filter 206 checks the content of the acquired phase information. If the current processing phase information indicates that processing for generating and outputting a print command by the command generation filter 206 has been started in step S703, the processing proceeds to step S704. In step S704, the command generation filter 206 then requests the spooler 203 to acquire identification information added to a print command that is being processed in the printing apparatus 120. The spooler 203, which has received the request, instructs the USB port monitor 208 to acquire the identification information added to the print command that is being processed in the printing apparatus 120. The USB port monitor 208, which has received the instruction from the spooler 203, acquires the identification information and notifies the spooler 203 of the acquired identification information according to the procedure illustrated in FIG. 3. In step S705, the command generation filter 206 then acquires the identification information, which has been acquired by the USB port monitor 208, from the spooler 203. In step S706, the command generation filter 206 then determines based on the acquired identification information whether the print command generated by itself is being processed in the printing apparatus 120. If the generated print command is being processed (YES in step S706), the processing proceeds to step S707. In step S707, the command generation filter 206 requests the OS to issue a print cancel command to the printing apparatus 120. The printing apparatus 120, which has received the print cancel command, immediately stops the print processing that is being performed, and shifts to an initial state. In step S708, the command generation filter 206 then deletes the print job corresponding to the print command output by itself from the print queue 204. In step S710, the processing for canceling the print job is ended. On the other hand, if the generated print command is not being processed (NO in step S706), the command generation filter 206 does not request the OS to issue a print cancel command to the printing apparatus 120, and deletes the print job corresponding to the print command output by itself from the print queue 204 in step S708. In step S710, the processing for canceling the print job by the command generation filter 206 is then ended. If the processing for outputting the print command by the command generation filter 206 is started, the spooler 203 sequentially sends the output print command to the printing apparatus 120 if the printing apparatus 120 is ready to receive the print command. On the other hand, if the print command previously input is being processed in the printing apparatus 120, the spooler 203 puts the sending processing on hold until the printing apparatus 120 becomes ready to receive the print command. Thus, if a request to cancel a print job has been received while the processing for generating and outputting a print command by the command generation filter 206 is being performed, the command generation filter 206 needs to request the OS to issue a print cancel command only if the command generation filter 206 detects that the print command output by itself is being processed in the printing apparatus 120 in step S706.

On the other hand, if the current processing phase information indicates that the processing for generating and outputting the print command by the command generation filter 206 has been completed in step S703, the processing proceeds to step S708. In step S708, the command generation filter 206 deletes the print job corresponding to the print command output by itself from the print queue 204. In step S710, the processing for canceling the print job by the command generation filter 206 is then ended. In this processing phase, it is obvious that the printing apparatus 120 has not yet started the print processing on the print command that has been output by the command generation filter 206. Thus, the command generation filter 206 does not need to request the OS to issue a print cancel command after step S703, and may only delete the print job corresponding to the print command output by itself from the print queue 204.

On the other hand, if the current processing phase information indicates that the print processing for the print command, which has been output by the command generation filter 206, is being performed in the printing apparatus 120 in step S703, the processing proceeds to step S709. In step S709, the command generation filter 206 requests the OS to issue the print cancel command. In step S708, the command generation filter 206 deletes the print job corresponding to the print command output by itself from the print queue 204. In step S710, the processing for canceling the print job by the command generation filter 206 is then ended. In this processing phase, it is obvious that the printing apparatus 120 is performing the print processing on the print command that has been output by the command generation filter 206. Thus, the command generation filter 206 may request the OS to issue a print cancel command without checking the identification information added to the print command being processed in the printing apparatus 120 after step S703.

As described above, the command generation filter 206, which has received a request to cancel a print job, acquires the identification information added to the print command that is being processed in the printing apparatus 120, to determine whether the print command output by itself is being processed. Further, the command generation filter 206 requests the OS to issue a print cancel command only if determining that the print command output by itself is being processed in the printing apparatus 120. Through the foregoing processing, only if the print job to be canceled is being processed in the printing apparatus 120, a print cancel command is issued to the printing apparatus 120 so that an appropriate print job cancel function can be implemented. Further, the command generation filter 206 can reduce the number of requests for acquiring the identification information from the printing apparatus 120 by referring to the processing phase information, so that a more efficient print job cancel function can be implemented.

Instead of a USB port, the information processing apparatus 110 and the printing apparatus 120 can also be connected to each other via a WSD port. If the command generation filter 206 determines that a WSD port is used as a communication port in step S403, the processing proceeds to step S422. In step S422, the command generation filter 206 subjects the received print data to conversion processing to generate a print command, which is interpretable by the printing apparatus 120, according to the print setting information added to the print data. In step S423, the command generation filter 206 then temporarily outputs the generated print command into the storage area (115 or 116) in the information processing apparatus 110. In step S424, the command generation filter 206 checks whether there exists any print data that has not yet been converted into a print command. If any unconverted print data exists (NO in step S424), the processing returns to step S422. If conversion of print data has been completed (YES in step S424), then in step S420, the command generation filter 206 returns control to the command generation filter control function of the OS. In step S425, the processing by the command generation filter 206 is ended.

If the information processing apparatus 110 and the printing apparatus 120 are connected to each other via a WSD port, a WSD port monitor (not illustrated) controls communication therebetween. The WSD port monitor has a function of determining the progress of the print processing in the printing apparatus 120 and storing the print job in the print queue 204 until the print processing is completed. Thus, if the information processing apparatus 110 and the printing apparatus 120 are connected to each other via a WSD port, the command generation filter 206 does not need to manage the progress status of print processing. More specifically, the command generation filter 206 may return control to the command generation filter control function of the OS immediately when the processing for generating and outputting the print command has been completed. Further, the WSD port monitor also has a function of acquiring a request to cancel the print processing that is being performed in the printing apparatus 120 and issuing a cancel command. Thus, the command generation filter 206 does not need to request the OS to issue a cancel command to the printing apparatus 120 even if receiving the cancel request.

In a second exemplary embodiment of the present invention, an example will be described in which an issue is solved using a method different from that in the first exemplary embodiment. In the present exemplary embodiment, the spooler 203 receives a request to cancel a print job. Further, the spooler 203 adds a request asking the OS to issue a print cancel command to the normal print job end processing according to the status of the printing apparatus 120 in receiving the request to cancel the print job, so that the issue is solved. Configurations, which are not particularly referred to, are similar to those in the first exemplary embodiment.

Figure 8:
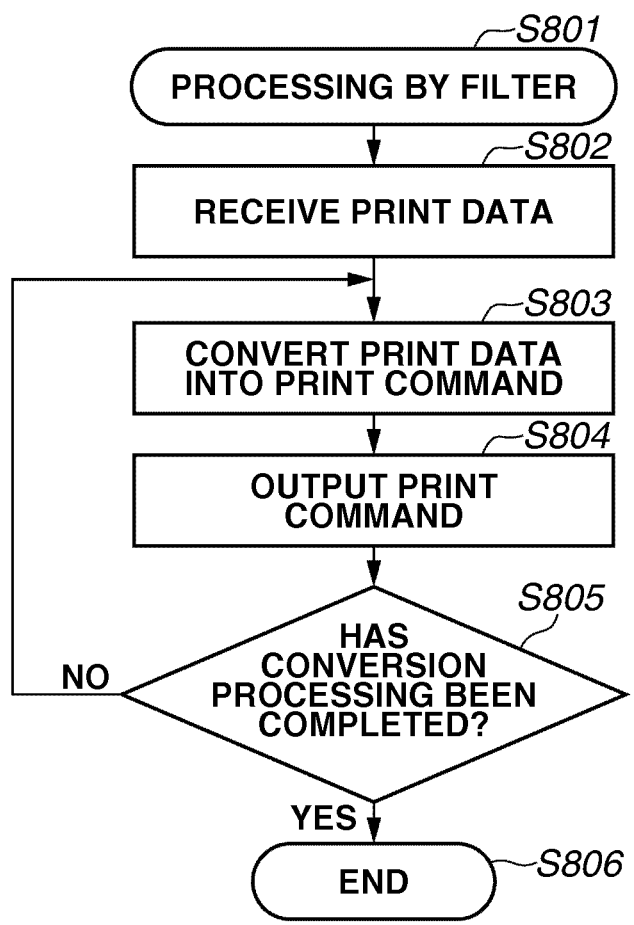
FIG. 8 is a flowchart illustrating processing by a command generation filter according to a second exemplary embodiment of the present invention.

FIG. 8 illustrates a flow of processing by a command generation filter 206 in the present exemplary embodiment. In step S801, the command generation filter 206 is started using the command generation filter control function of the OS. In step S802, the command generation filter 206 receives print data generated by the application 201. In step S803, the command generation filter 206 then performs predetermined conversion processing on the received print data to generate a print command that is interpretable by the printing apparatus 120. In step S804, the command generation filter 206 then outputs the generated print command to the RAM 116 in the information processing apparatus 110. In step S805, the command generation filter 206 determines whether there remains any print data that has not yet been converted into a print command. If any unconverted print data remains (NO in step S805), the processing returns to step S803. In step S803, the command generation filter 206 performs conversion processing on the unconverted print data. If no unconverted print data remains (YES in step S805), then in step S806, the processing is ended.

Figure 9:
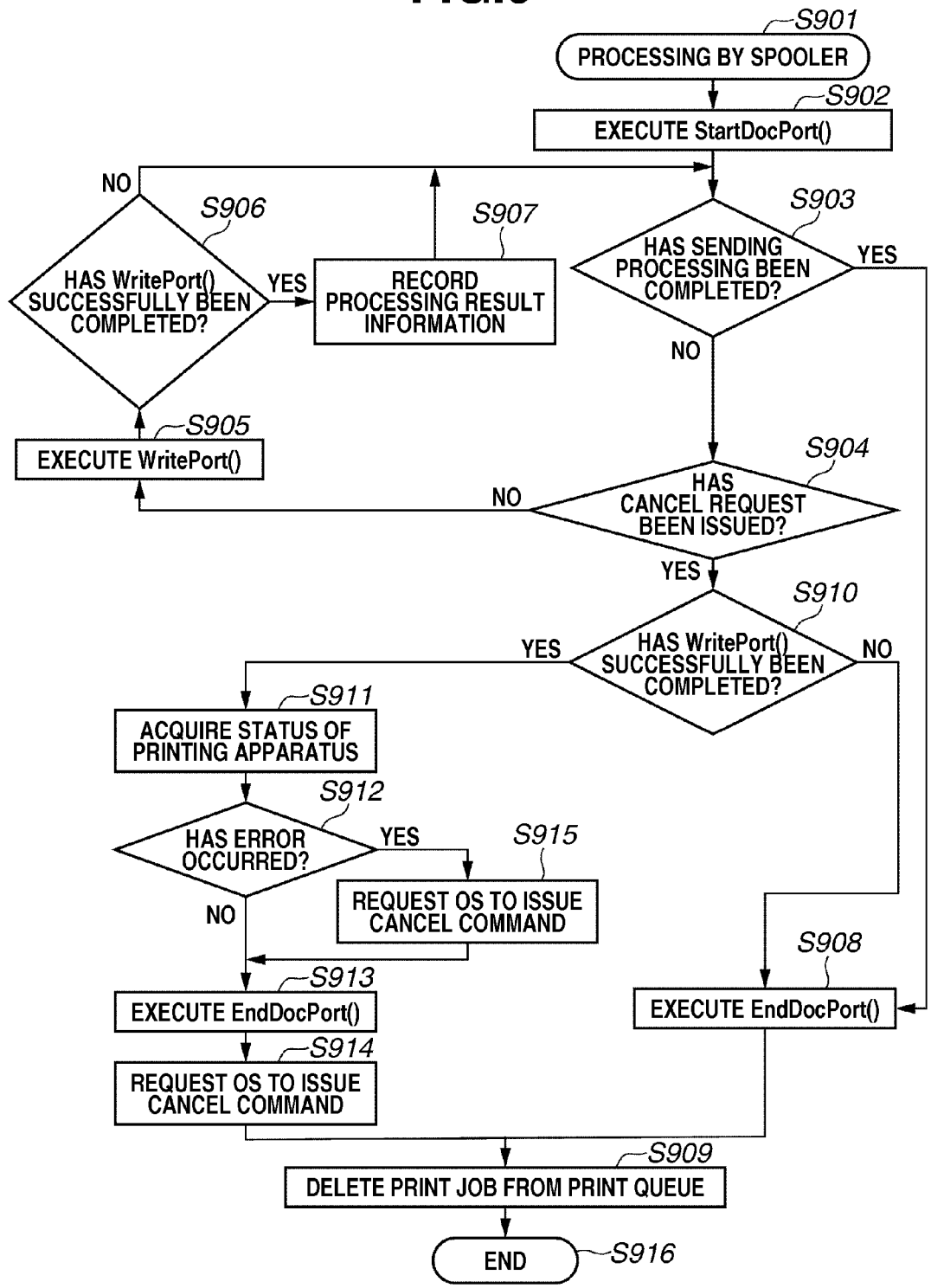
FIG. 9 is a flowchart illustrating processing by a spooler.

FIG. 9 illustrates a flow of processing by the spooler 203. In step S901, when the command generation filter 206 outputs a print command, which is interpretable by the printing apparatus 120, to the RAM 120, the spooler 203 starts processing for sending the print command. In step S902, the spooler 203 then executes StartDocPort( ) of the USB port monitor 208, and notifies the USB port monitor 208 of starting the print command sending processing. In step S903, the spooler 203 then determines whether any print command to be sent to the printing apparatus 120 remains in the RAM 116. If any print command to be sent remains (NO in step S903), then in step S904, the spooler 203 determines whether a request to cancel processing for sending the print command has been issued. If the cancel request has not yet been issued (NO in step S904), then in step S905, the spooler 203 executes WrintePort( ) of the USB port monitor 208, and transfers the print command to the USB port monitor 208. The USB port monitor 208 sequentially sends the received print command to the printing apparatus 120. In step S906, the spooler 203 then determines whether WritePort( ) of the USB port monitor 208 has successfully been completed. If WritePort( ) has successfully been completed (YES in step S906), then in step S907, the spooler 203 records in a predetermined area information indicating that WritePort( ) of the USB port monitor 208 has successfully been completed, as processing result information. Then, the processing by the spooler 203 returns to step S903. If WritePort( ) has not successfully been completed (NO in step S906), the processing by the spooler 203 immediately returns to step S903.

On the other hand, if no print command to be sent remains (YES in step S903), then in step S908, the spooler 203 executes EndDocPort( ) of the USB port monitor 208, and notifies the USB port monitor 208 of ending the processing for sending the print command. In step S909, the spooler 203 then deletes the print job corresponding to the print command, on which the sending processing has been completed, from the print queue 204. In step S916, the print command sending processing is ended.

Processing performed when the spooler 203 has detected the request to cancel the sending processing in the determination in step S904 will be described below. If the spooler 203 has detected the request to cancel the sending processing (YES in step S904), then in step S910, the spooler 203 refers to the processing result information, which has been recorded by the spooler 203 in step S907, and determines whether WritePort( ) of the USB port monitor 208 has successfully been completed.

If the processing result information is not information indicating that WritePort( ) has successfully been completed (NO in step S910), then in step S908, the spooler 203 executes EndDocPort( ) of the USB port monitor 208, and notifies the USB port monitor 208 of ending the processing for sending the print command. In step S909, the spooler 203 then deletes the print job corresponding to the print command, on which the sending processing has been completed, from the print queue 204. In step S916, the print command sending processing is ended. The printing apparatus 120 does not start print processing for the print command sent by the spooler 203 unless WritePort( ) has successfully been completed at least once in step S905. More specifically, if WritePort( ) has not successfully been completed (NO in step S910), processing for the print job to be canceled is not in progress in the printing apparatus 120, and the spooler 203 is not to request the OS to issue a print cancel command to the printing apparatus 120. On the other hand, if the processing result information is information indicating that WritePort( ) has successfully been completed (YES in step S910), then in step S911, the spooler 203 acquires status information indicating the status of the printing apparatus 120 from the USB port monitor 208. In step S912, the spooler 203 determines whether the acquired status information indicates that an error has occurred in the printing apparatus 120, which causes the printing apparatus 120 to be unable to continue the print processing for the print command being sent by the spooler 203. If the spooler 203 detects that the printing apparatus 120 is not in a state where an error causes the printing apparatus 120 to be unable to continue the print processing (NO in step S912), then in step S913, the spooler 203 executes EndDocPort( ) of the USB port monitor 208, and notifies the USB port monitor 208 of ending the processing for sending the print command. In step S914, the spooler 203 then requests the OS to issue a print cancel command to the printing apparatus 120. When receiving the print cancel command, the printing apparatus 120 stops the print processing for the print command, which has been sent by the spooler 203 and shifts to an initial state. In step S909, the spooler 203 deletes the print job corresponding to the print command, on which the sending processing has been completed, from the print queue 204. In step S916, the print command sending processing is ended. On the other hand, if the spooler 203 determines that the printing apparatus 120 is in a state where an error causes the printing apparatus 120 to be unable to continue the print processing (YES in step S912), then in step S915, the spooler 203 requests the OS to issue the print cancel command prior to processing for executing EndDocPort( ) of the USB port monitor 208 in step S913. When receiving the print cancel command, the printing apparatus 120 stops the print processing for the print command sent by the spooler 203, and shifts from the error state that causes the printing apparatus 120 to be unable to continue the print processing to the initial state. In step S913, the spooler 203 then executes EndDocPort( ) of the USB port monitor 208. In step S914, the spooler 203 then requests the OS to issue a print cancel command to the printing apparatus 120. In step S909, the spooler 203 then deletes the print job corresponding to the print command, on which the sending processing has been completed, from the print queue 204. In step S916, the print command sending processing is ended.

If WritePort( ) has successfully been completed at least once in step S905, the printing apparatus 120 starts the print processing for the print command sent by the spooler 203. Thus, if the spooler 203 detects that WritePort( ) of the USB port monitor 208 has successfully been completed (YES in step S910), the spooler 203 is to request the OS to issue the print cancel command. However, if an error has occurred in the printing apparatus 120, which causes the printing apparatus 120 to be unable to continue the print processing, processing in EndDocPort( ) of the USB port monitor 208 cannot be completed. If the printing apparatus 120 is in the error state which causes the printing apparatus 120 to be unable to continue the print processing (YES in step S912), the spooler 203 adds processing for requesting the OS to send the print cancel command before executing EndDocPort( ) of the USB port monitor 208 in step S913. Thus, the printing apparatus 120 shifts from the error state to the initial state before End-DocPort( ) of the USB port monitor 208 is executed. Thus, the processing in EndDocPort( ) of the USB port monitor 208 can successfully be completed. Processing for sending the print command from the spooler 203 to the USB port monitor 208 and processing for sending the print command from the USB port monitor 208 to the printing apparatus 120 by executing WritePort( ) of the USB port monitor 208 are synchronously processed. When the printing apparatus 120, which has received the print cancel command, shifts from the error state to a state where the print command can be received, if the print command, which has not yet reached the printing apparatus 120, exists in an internal storage area (not illustrated) of the USB port monitor 208, the USB port monitor 208 may send the print command to the printing apparatus 120. Thus, the printing apparatus 120 may receive a print command not to be received and start processing that is not expected by an application or a user. The print command, which has not yet reached the printing apparatus 120, stored in the internal storage area (not illustrated) of the USB port monitor 208 is deleted by executing EndDocPort( ) of the USB port monitor 208. Thus, the spooler 203 needs to request the OS to issue the print cancel command again after executing EndDocPort( ) of the USB port monitor 208 to ensure that the printing apparatus 120 shifts to the initial state.

As described above, if the printing apparatus 120 is in the error state where the print processing cannot be continued, the spooler 203 adds a request asking the OS to issue the print cancel command before executing EndDocPort( ) of the USB port monitor 208, to shift the printing apparatus 120 to the state where the print command can be received. Thus, the USB port monitor 208 can successfully complete the processing in EndDocPort( ) and can implement appropriate print job cancel processing even if the printing apparatus 120 is in the error state.

In a third exemplary embodiment of the present invention, an example will be described in which an issue is solved using a method different from those in the first and second exemplary embodiments. In the third exemplary embodiment, if an error that causes the printing apparatus 120 to be unable to continue print processing has occurred therein, the OS forcedly ends all output processes, which have been issued to the printing apparatus 120, to solve the issue. Processing by the command generation filter 206 in the third exemplary embodiment is similar to that in the second exemplary embodiment. Configurations, which are not particularly referred to, are similar to those in the first exemplary embodiment.

Figure 10:
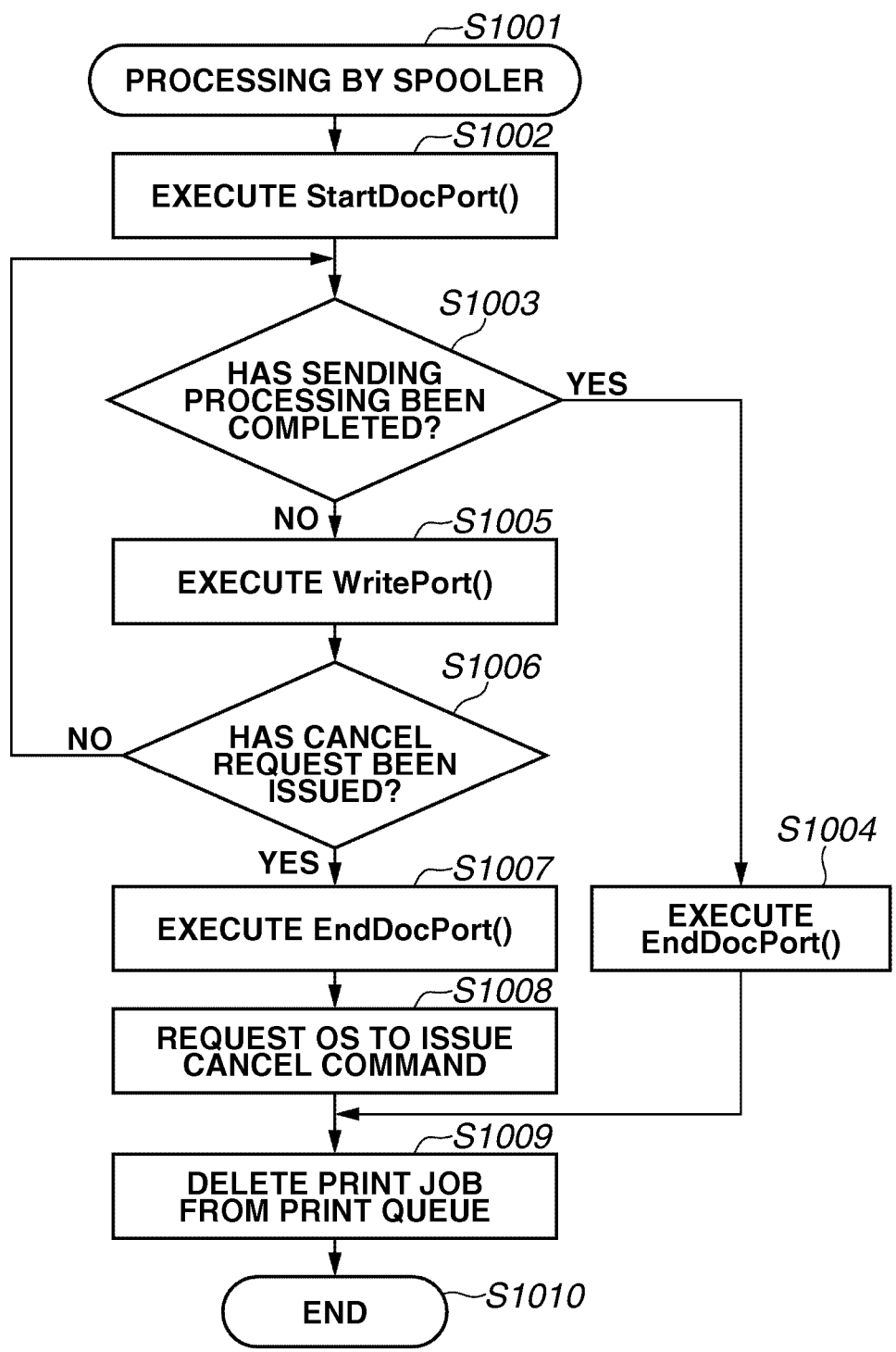
FIG. 10 is a flowchart illustrating processing by the spooler according to the second exemplary embodiment.

FIG. 10 illustrates a flow of processing by the spooler 203. In step S1001, when the command generation filter 206 outputs a print command, which is interpretable by the printing apparatus 120, to the RAM 120, the spooler 203 starts processing for sending the print command. In step S1002, the spooler 203 then executes StartDocPort( ) of the USB port monitor 208, and notifies the USB port monitor 208 of starting the processing for sending the print command. In step S1003, the spooler 203 then determines whether any print command to be sent to the printing apparatus 120 remains in the RAM 116. If the spooler 203 detects that no print command to be sent remains (YES in step S1003), then in step S1004, the spooler 203 executes EndDocPort( ) of the USB port monitor 208, and notifies the USB port monitor 208 of ending the processing for sending the print command. In step S1009, the spooler 203 then deletes the print job corresponding to the print command, on which the sending processing has been completed, from the print queue 204. In step S1010, the print command sending processing by the spooler 203 is ended. On the other hand, if the spooler 203 detects that any print command to be sent remains (NO in step S1003), then in step S1005, the spooler 203 executes WritePort( ) of the USB port monitor 208, and transfers the print command to the USB port monitor 208. In step S1006, the spooler 203 determines whether a request to cancel the processing for sending the print command has been issued. If the spooler 203 has not detected the cancel request (NO in step S1006), the processing returns to step S1003. If the spooler 203 has detected the cancel request (YES in step S1006), then in step S1007, the spooler 203 executes EndDocPort( ) of the USB port monitor 208, and notifies the USB port monitor 208 of ending the processing for sending the print command. In step S1008, the spooler 203 requests the OS to issue a print cancel command to the printing apparatus 120. In step S1009, the spooler 203 then deletes the print job corresponding to the print command, on which the sending processing has been completed, from the print queue 204. In step S1010, the print command sending processing is ended.

Here, the USB port monitor 208 executes CancelIo( ) of the OS as one of the processing in EndDocPort( ) By executing CancelIo( ) if there is any uncompleted output process among the output processes issued to the printing apparatus 120, the USB port monitor 208 stops the uncompleted output process. On the other hand, a process for output of the print command from the USB port monitor 208 to the printing apparatus 120 is performed in a plurality of threads. The output process, which can be stopped by executing CancelIo( ) is limited to an output process that has been issued from the same thread as the thread in which CancelIo( ) has been executed. For output processes that have been issued from the other thread, the OS does not end the processing in CancelIo( ) until all the output processes have been completed. Therefore, while an error has occurred in the printing apparatus 120, all the output processes issued from each of the threads to the printing apparatus 120 have not been completed. Thus, CancelIo( ) cannot be ended, and the USB port monitor 208 cannot perform processing subsequent to the processing in EndDocPort( ).

Figure 11:
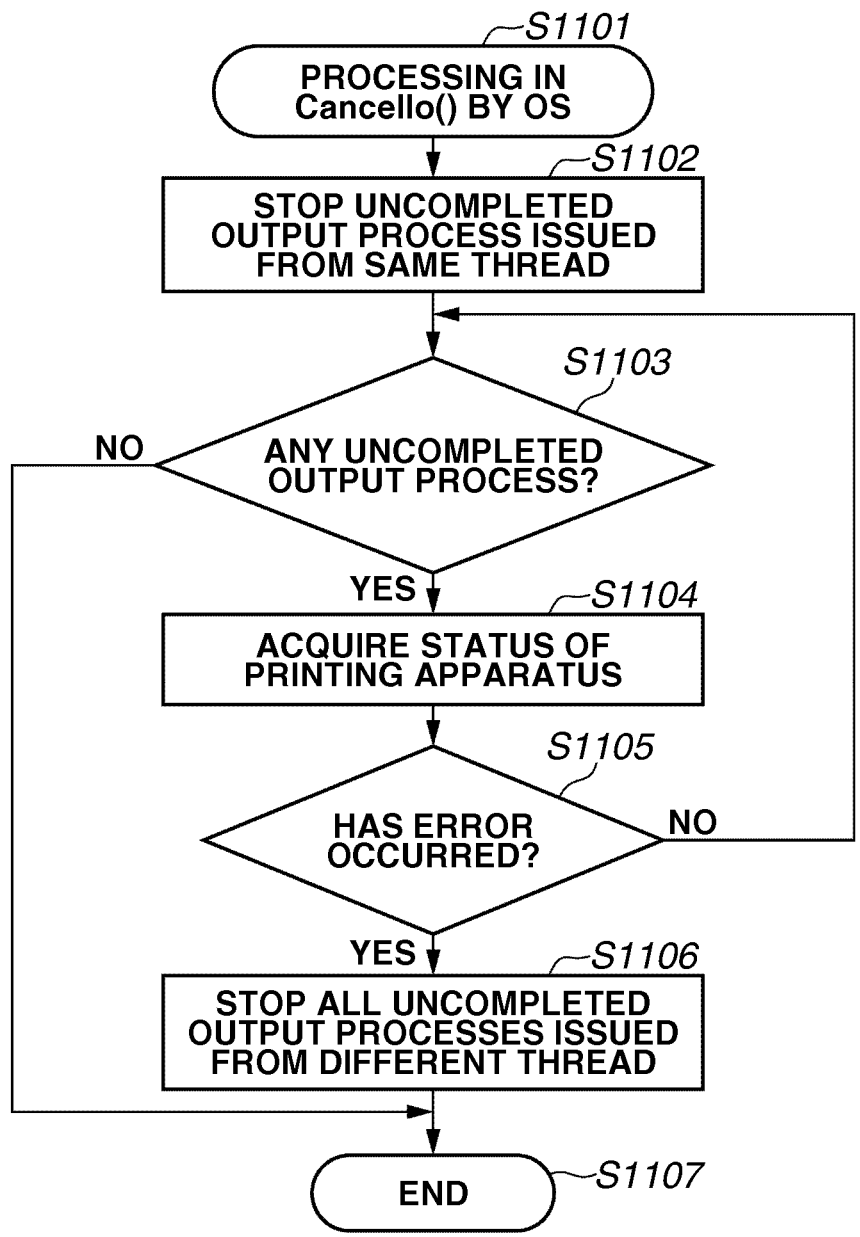
FIG. 11 is a flowchart illustrating internal processing in CancelIo( ).

Therefore, in the third exemplary embodiment, a processing procedure illustrated in FIG. 11 is used in CancelIo( ) to solve this issue. If the spooler 203 executes EndDocPort( ) of the USB port monitor 208, the processing proceeds to step S1101. In step S1101, the USB port monitor 208 executes CancelIo( ) of the OS as internal processing in EndDocPort. In step S1102, the OS then stops an uncompleted output process among the output processes issued to the printing apparatus 120 from a specific thread, i.e., the same thread as the thread in which CancelIo( ) has been executed. In step S1103, the OS then determines whether there is any uncompleted output process issued to the printing apparatus 120 from a thread different from the thread in which CancelIo( ) has been executed. If the OS detects that all the output processes issued to the printing apparatus 120 have been completed (NO in step S1103), then in step S1107, the OS ends the processing in CancelIo( ). On the other hand, if all the output processes issued to the printing apparatus 120 have not yet been completed (YES in step S1103), then in step S1104, the OS acquires the status information of the printing apparatus 120 from the printing apparatus 120. In step S1105, the OS then determines whether the acquired status information indicates that the printing apparatus 120 is in the error state. If the OS determines that the printing apparatus 120 is not in the error state (NO in step S1105), the processing returns to step S1103. On the other hand, if the OS determines that the printing apparatus 120 is in the error state (YES in step S1105), then in step S1106, the OS stops all the uncompleted output processes even if they are issued from the thread different from the thread in which CancelIo( ) has been executed. Lastly, in step S1107, the OS ends the processing in CancelIo( ).

Generally, the spooler 203 determines that the processing for sending the print command to the printing apparatus 120 has been completed, at the time when the spooler 203 has detected the completion of WritePort( ) of the USB port monitor 208. However, the output process from the USB port monitor 208 to the printing apparatus 120 may not immediately been completed due to a processing load of the OS or an operation status of the printing apparatus 120 even if the printing apparatus 120 is not in the error state. At this time, a large difference may occur between the size of the print command, which the spooler 203 recognizes has reached the printing apparatus 120 and the size of the print command, which has actually reached the printing apparatus 120, if the OS always stops all the output processes issued to the printing apparatus 120 regardless of the status of the printing apparatus 120. This is not a preferable situation in terms of an operation of software. For example, an application indicating the progress status of the print job by acquiring the size of the print command, which has been sent to the printing apparatus 120 via the spooler 203, cannot indicate appropriate information. Thus, the OS is to stop all the output processes issued to the printing apparatus 120 only when an error that causes the printing apparatus 120 to be unable to complete all the output processes has occurred therein.

As described above, in the processing in CancelIo( ) if the printing apparatus 120 is in the error state where the print processing cannot be continued, the OS stops all the uncompleted output processes even if they are issued from the thread different from the thread in which CancelIo( ) has been executed. Thus, even if the printing apparatus 120 is in the error state, the USB port monitor 208 can end the processing in EndDocPort( ) and subsequently the spooler 203 can make a request to issue a print cancel command.

A fourth exemplary embodiment of the present invention will be described below. The exemplary embodiments of the present invention can be realized by supplying, to a system or an apparatus, a storage medium storing a program code of software for implementing the functions of the above-mentioned exemplary embodiments, and causing a computer, a CPU, or a micro-processing unit (MPU) in the system or the apparatus to read out and execute the program code stored in the storage medium. In this case, the program code read from the storage medium itself implements the functions of the above-mentioned exemplary embodiments, and the storage medium storing the program code is an exemplary embodiment of the present invention.

The storage medium for supplying the program code can include a flexible disk, a hard disk, a solid state device (SSD), an optical disk, a magneto-optical disk, a compact disk read only memory (CD-ROM), a compact disk recordable (CD-R), a magnetic tape, a nonvolatile memory card, a ROM, and a digital versatile disk (DVD). The present exemplary embodiment includes not only a case where the computer executes the read program code so that the functions of the above-mentioned exemplary embodiments are implemented but also a case where the OS, which is operating on the computer, performs some or all of actual processes based on an instruction of the program code, and the functions of the above-mentioned exemplary embodiments are implemented through the processes.

Further, the present exemplary embodiment also includes a case where after the program code read from the storage medium is written into a memory provided in an function expansion board inserted into the computer or a function expansion unit connected to the computer, a CPU provided in the function expansion board or the function expansion unit performs some or all of actual processes based on an instruction of the program code, and the functions of the above-mentioned exemplary embodiments are implemented through the processes.

According to the present exemplary embodiments of the present invention, in a printer driver not including a bidirectional communication control module as a constituent element, an appropriate print job cancel function can be implemented.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-001087 filed Jan. 8, 2013, which is hereby incorporated by reference herein in its entirety.

What is claimed is:

1. An information processing apparatus comprising:
an acquisition unit configured to acquire status information indicating a status of a printing apparatus;
a control unit configured to return control to an operating system (OS) if the status information acquired by the acquisition unit indicates that the print processing in the printing apparatus has been completed, and configured not to return control to the OS if the status information acquired by the acquisition unit indicates that the print processing in the printing apparatus has not been completed; and
an instruction unit configured to instruct the printing apparatus to stop print processing for a print command processed by the printing apparatus,
wherein information of the print command is deleted from a print queue by returning the control to the OS,
wherein information of the print command is stored in the print queue until returning the control to the OS whereby the instruction unit can instruct the printing apparatus to stop print processing for the print command, and
wherein the print command is generated by a printer driver configured not to include a language monitor.

2. The information processing apparatus according to claim 1, further comprising a request acquisition unit configured to acquire a request to stop the print command to be processed by the printing apparatus,
wherein the instruction unit instructs the printing apparatus to stop the print processing for the print command to be processed by the printing apparatus via a universal serial bus, if the request acquisition unit acquires the request to stop the print command and if the status information acquired by the acquisition unit indicates that the printing apparatus is in a state where the print processing cannot be continued.

3. The information processing apparatus according to claim 1, further comprising a deletion unit configured to delete the print command from a print queue after the instruction unit instructs the printing apparatus to stop the print processing for the print command via a universal serial bus.

4. The information processing apparatus according to claim 1,
wherein the instruction unit instructs the printing apparatus to stop the print processing for the print command via a universal serial bus port monitor, and
wherein the universal serial bus port monitor operates according to a port monitor expansion file.

5. The information processing apparatus according to claim 1, wherein the instruction unit instructs the printing apparatus to stop the print processing via a universal serial bus before providing a notification of completion of processing for sending the print command.

6. The information processing apparatus according to claim 1, further comprising a determination unit configured to determine whether processing for sending the print command has successfully been completed at least once,
wherein, if the determination unit determines that the processing for sending the print command has successfully been completed at least once and if the status information acquired by the acquisition unit indicates that the printing apparatus is in a state where the print processing cannot be continued, the instruction unit instructs the printing apparatus to stop the print processing for the print command to be processed by the printing apparatus via a universal serial bus.

7. The information processing apparatus according to claim 1, further comprising:
a generation unit configured to generate the print command;
an acquisition unit configured to acquire identification information of the print command while the print processing of the print command is performed in the printing apparatus; and
a determination unit configured to determine, based on the acquired identification information, whether the print command being processed in the printing apparatus is generated by the generating unit, wherein, if the print command being processed in the printing apparatus is determined to be generated by the generating unit and information of the print command is stored in the print queue, the instruction unit instructs the printing apparatus to stop print processing for the print command.

8. A non-transitory storage medium storing a program to cause an information processing apparatus to perform a control method, the control method comprising:
acquiring status information indicating a status of a printing apparatus;
returning control to an operating system (OS) if the acquired status information indicates that the print processing in the printing apparatus has been completed, and not returning control to the OS if the acquired status information indicates that the print processing in the printing apparatus has not been completed; and
instructing the printing apparatus to stop print processing for a print command processed by the printing apparatus,
wherein information of the print command is deleted from a print queue by returning the control to the OS,
wherein information of the print command is stored in the print queue until returning the control to the OS whereby instructing is able to instruct the printing apparatus to stop print processing for the print command, and
wherein the print command is generated by a printer driver configured not to include a language monitor.

9. The non-transitory storage medium according to claim 8, the control method further comprising acquiring a request to stop the print command to be processed by the printing apparatus,
wherein instructing includes instructing the printing apparatus to stop the print processing for the print command to be processed by the printing apparatus via a universal serial bus, if acquiring includes acquiring the request to stop the print command is acquired and if the acquired status information indicates that the printing apparatus is in a state where the print processing cannot be continued.

10. The non-transitory storage medium according to claim 8, the control method further comprising deleting the print command from a print queue after instructing instructs the printing apparatus to stop the print processing for the print command via a universal serial bus.

11. The non-transitory storage medium according to claim 8,
wherein instructing includes instructing the printing apparatus to stop the print processing for the print command via a universal serial bus port monitor, and
wherein the universal serial bus port monitor operates according to a port monitor expansion file.

12. The non-transitory storage medium according to claim 8, wherein instructing includes instructing the printing apparatus to stop the print processing via a universal serial bus before providing a notification of completion of processing for sending the print command.

13. The non-transitory storage medium according to claim 8, the control method further comprising determining whether processing for sending the print command has successfully been completed at least once,
wherein, if it is determined that the processing for sending the print command has successfully been completed at least once and if the acquired status information indicates that the printing apparatus is in a state where the print processing cannot be continued, instructing includes instructing the printing apparatus to stop the print processing for the print command to be processed by the printing apparatus via a universal serial bus.

14. A control method for an information processing apparatus, the control method comprising:
acquiring status information indicating a status of a printing apparatus;
returning control to an operating system (OS) if the acquired status information indicates that the print processing in the printing apparatus has been completed, and not returning control to the OS if the acquired status information indicates that the print processing in the printing apparatus has not been completed; and
instructing the printing apparatus to stop print processing for a print command processed by the printing apparatus,
wherein information of the print command is deleted from a print queue by returning the control to the OS,
wherein information of the print command is stored in the print queue until returning the control to the OS whereby instructing is able to instruct the printing apparatus to stop print processing for the print command, and
wherein the print command is generated by a printer driver configured not to include a language monitor.

15. The control method according to claim 14, further comprising acquiring a request to stop the print command to be processed by the printing apparatus,
wherein instructing includes instructing the printing apparatus to stop the print processing for the print command to be processed by the printing apparatus via a universal serial bus, if acquiring includes acquiring the request to stop the print command and if the acquired status information indicates that the printing apparatus is in a state where the print processing cannot be continued.

16. The control method according to claim 14, further comprising deleting the print command from a print queue after instructing instructs the printing apparatus to stop the print processing for the print command via a universal serial bus.

17. The control method according to claim 14,
wherein instructing includes instructing the printing apparatus to stop the print processing for the print command via a universal serial bus port monitor, and
wherein the universal serial bus port monitor operates according to a port monitor expansion file.

18. The control method according to claim 14, wherein instructing includes instructing the printing apparatus to stop the print processing via a universal serial bus before providing a notification of completion of processing for sending the print command.

19. The control method according to claim 14, further comprising determining whether processing for sending the print command has successfully been completed at least once,
wherein, if it is determined that the processing for sending the print command has successfully been completed at least once and if the acquired status information indicates that the printing apparatus is in a state where the print processing cannot be continued, instructing includes instructing the printing apparatus to stop the print processing for the print command to be processed by the printing apparatus via a universal serial bus.

* * * * *